United States Patent [19]

May

[11] Patent Number: 5,487,554

[45] Date of Patent: Jan. 30, 1996

[54] BICYCLE TRAINING APPARATUS

[76] Inventor: William A. May, 3701 Rice Blvd., Houston, Tex. 77005

[21] Appl. No.: 286,655

[22] Filed: Aug. 5, 1994

[51] Int. Cl.[6] .................................. B62H 1/10; B62J 9/00
[52] U.S. Cl. .......................................... 280/293; 224/32 A
[58] Field of Search ....................................... 280/293, 295, 280/296, 301, 302, 288.4, 47.131; 224/30 R, 32 A

[56] References Cited

U.S. PATENT DOCUMENTS

| 3,437,351 | 2/1967 | Newbern | 280/205 |
|---|---|---|---|
| 3,485,507 | 12/1969 | Christof | 280/202 |
| 3,650,544 | 3/1972 | Cassell | 280/293 |
| 3,791,116 | 2/1974 | Wykhuis | 56/17.5 |
| 4,903,975 | 2/1990 | Weisbrodt et al. | 280/93 |
| 4,917,398 | 4/1990 | de Miranda Pinto | 280/293 |
| 5,154,096 | 10/1992 | Geller et al. | 74/551.8 |
| 5,242,183 | 9/1993 | Oberg et al. | 280/293 |
| 5,330,221 | 7/1994 | Sutton | 280/293 |
| 5,338,204 | 8/1994 | Herndon | 280/293 X |
| 5,395,130 | 3/1995 | Rubin | 280/293 X |

FOREIGN PATENT DOCUMENTS

| 138200 | 2/1920 | United Kingdom | 280/295 |

Primary Examiner—Kevin Hurley
Attorney, Agent, or Firm—Conley, Rose & Tayon

[57] ABSTRACT

A bicycle training device is provided which extends upwardly and rearwardly from the rear of a bicycle to allow an individual to support a rider in an upright position on the bicycle. The training device includes two generally U-shaped members which connect behind the bicycle. A grippable section is thus formed substantially parallel to the ground at an adjustable height.

11 Claims, 2 Drawing Sheets

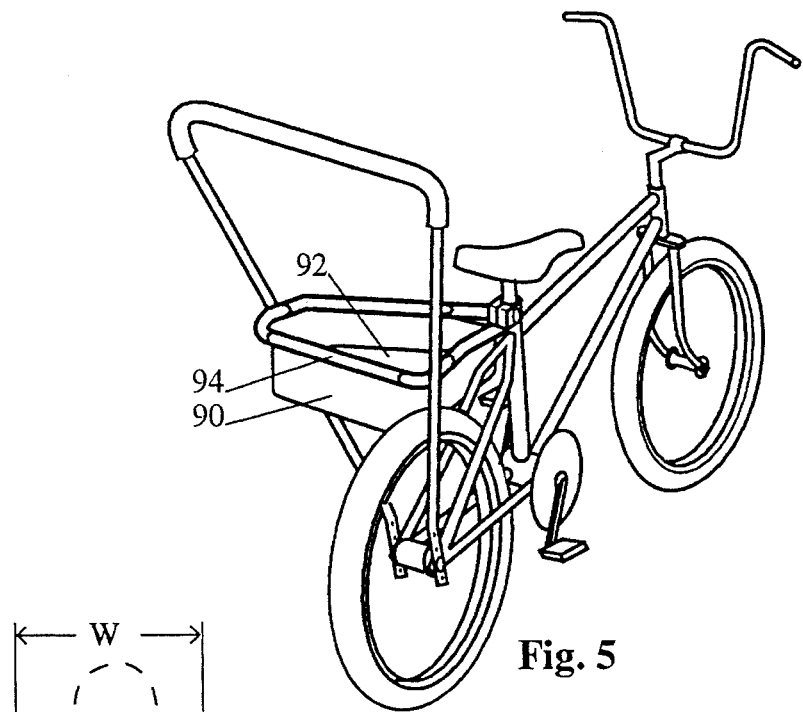
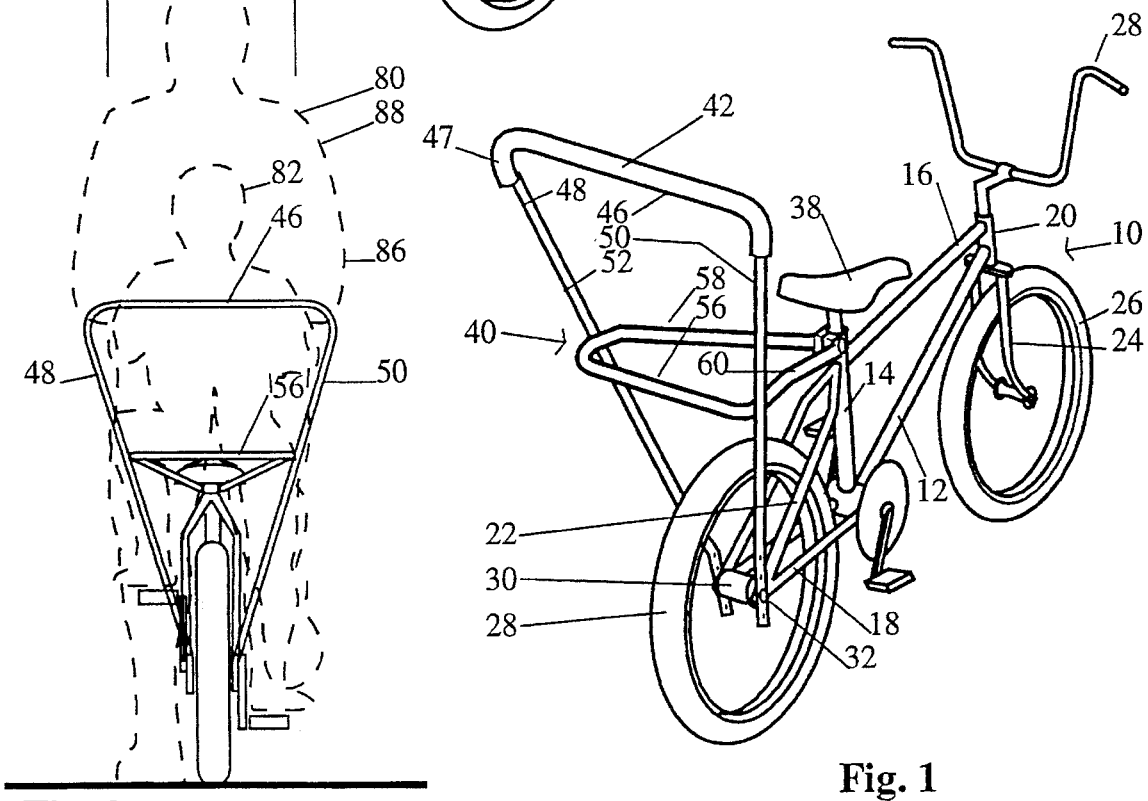

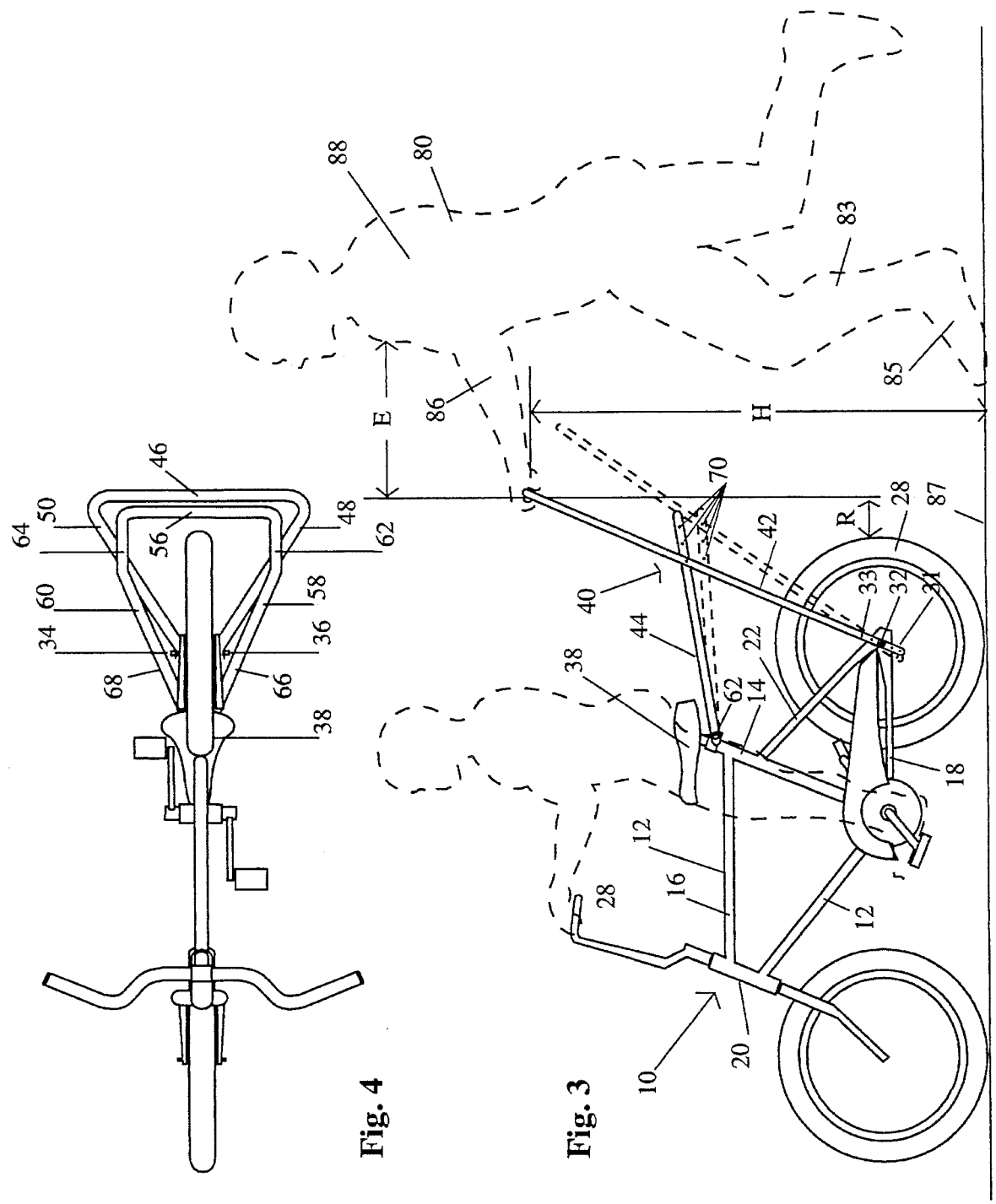

BICYCLE TRAINING APPARATUS

BACKGROUND OF THE INVENTION

The present invention is directed to devices for assisting individuals learning to ride a wheeled vehicle wherein the vehicle must be balanced by the rider. More particularly, the present invention relates to training devices for bicycles and the like.

One of the rites of passage of childhood is learning to ride a bicycle. To learn to ride a bicycle, the learner must learn to balance the bicycle on its two wheels while simultaneously pedaling and steering the bicycle. The first attempts to ride commonly involve crashes or tips. To help the rider learn to ride, an adult or other individual will commonly hold the back of the seat, to help stabilize the bicycle as the rider pedals and steers. However, this is commonly difficult for both the rider and helper, because the helper must lean down, and over, to hold the back of the bicycle seat. As a result, the helper is not upright as he helps the learner and tends to tip the bicycle from an upright position thus hindering, rather than helping, the rider learn to stabilize the bicycle.

Several mechanisms have been proposed for use with a bicycle to allow a second individual, such as a parent or other adult, to stabilize the bicycle while the learner learns to pedal and steer. The training devices help the learner obtain confidence and balance to more quickly acquire the skills necessary for riding.

U.S. Pat. No. 3,650,544 Cassell, discloses a training device which may be attached to a bicycle to allow a helper to hold a bicycle upright while the rider learns to ride the bicycle. The device disclosed therein includes an upright pole 12 over which a ring 42 is placed. The helper uses the ring to hold the pole in a generally vertical position, or may directly grasp the pole with his hand. The pole extends upward from the bicycle at a position directly behind the seat, and the helper must therefore walk or run alongside the bicycle at a distance equal to or less than the helper's arm length in order to grip the ring or pole. Because the helper's stride is commonly equal to his or her arm length, the helper cannot run behind the bicycle because their feet would hit the bicycle wheel. Therefore, the helper must run along the side of the bicycle, and thus will tend to tip the bicycle as he runs beside it. Further, he can use only one hand on the pole and still be able to easily run alongside the bicycle. When using only one hand, it is relatively easy to pull the bicycle up when it tips away from the helper, but relatively difficult to pull it up if it tips toward the helper and the helper must pull it up across his body.

U.S. Pat. No. 4,903,975, Weisbrodt, discloses a bicycle training device which extends rearwardly from the bicycle. The helper holds the cross bar behind the bicycle, and the bar is positioned at a position sufficiently distant from the rear wheel to allow the helper to run behind the bicycle. However, the cross bar on which the helper places his hands to control the bicycle, is as wide as or smaller than the width of the rear axle bolt. This arrangement is difficult to control. The cross bar is stabilized by a single support member attached to the bicycle frame which allows considerable wobbling of the cross bar during a tip. Also, if the helper is running directly behind the bicycle, the preferred position to hold the bicycle upright, the helper's hands are within the envelope of the helpers shoulders. In this position, the helper's hands and arms are in a position where the muscles have their minimum strength potential. As a result, it is difficult for the helper to maintain the bike upright if any substantial side to side tipping occurs.

SUMMARY OF THE INVENTION

The present invention is a bicycle riding training device for use with a bicycle or other wheeled device where the rider must maintain the vertical stability of the device, which allows a helper to run or walk behind the bicycle with his hands comfortably extendable on the device. The training device provides for a rigid guidance frame made up of a handle member and a bracing member which are interconnected and attachable to a bicycle at the rear wheel hub and on the bicycle frame.

The handle member is substantially U-shaped and has a grippable base section and a pair of legs extending distally from the ends of the base section. The grippable base section is typically 16 to 30 inches in width to provide a broad grip for suitable ease of guidance by the helper. The distal ends of the handle member's legs converge to correspond to the approximate width of the bicycle's rear wheel hub. When attached to the bicycle, the handle member extends at a rearward and upward angle from the rear wheel hub.

The bracing member is also substantially U-shaped and has a transverse section with a pair of arms extending distally from the ends thereof. The distal ends of the arms converge for attachment to the bicycle frame. Proximate portions of the arms of the bracing member are connectable to the legs of the handle member. When interconnected with the bicycle frame and the handle member, the bracing member stabilizes the handle member to limit rotation of the handle member about the bicycle rear axle and to limit the lateral motion of the handle member with respect to the bicycle frame. Preferably, a number of connection points are provided on the legs of the bracing member to permit adjustment of the height of the handle member above the ground and the projection of the handle member behind the rear wheel.

In operation, the training device provides a very rigid framework with a wide gripping area by which a bicycle is easily controlled by a helper to avert falls. The gripping area is disposed above and rearward of the bicycle frame. In preferable embodiments, the handle member includes a conformable sleeve covering made of soft material so that the helper can comfortably grip the handle and maintain the bicycle upright as the learner pedals and steers.

Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 1 is a perspective view of a bicycle having the training device of the present invention installed thereon;

FIG. 2 is a rear view of the training device and bicycle, showing the back of the rider and helper in phantom;

FIG. 3 is a side elevation view of the training device and bicycle of FIG. 1 with a rider and helper shown in phantom;

FIG. 4 is a top view of the training device and bicycle of FIG. 1; and

FIG. 5 is a perspective view of the training device of the present invention further including a carrier mounted thereon.

DETAILED DESCRIPTION OF THE PREFERRED EMBODIMENTS

Referring initially to FIG. 1, an exemplary bicycle 10 is shown which includes the training device 40 of the present invention mounted thereon. The reader should understand that the specific construction of the bicycle 10 may vary with this particular design being briefly described to facilitate understanding of the invention.

Exemplary bicycle 10 includes a frame 12, which includes a central seat tube 14 and a forward triangular support member 16 and a rear support member 18 extending therefrom. Front support member 16 terminates in a head tube 20, and rear support member 18 terminates in a pair of opposed dropouts 22. The steering tube of fork 24 is received through head tube 20, and fork 24 receives a front wheel 26 therein. A handle bar 28 is received in the upper end of the steering tube through head tube 20. A rear wheel 28 is received in opposed dropouts 22 and support member 18. Rear wheel 28 includes a bearing hub 30 therein, through which an axle 32 is received. Axle 32 extends through hub 30 and includes threaded ends 34, 36 (FIG. 4) which extend through opposed dropouts 22 and are connected thereto by nuts (not shown). A seat 38 is located over the upper terminal end of seat tube 14.

Referring now to FIGS. 1 to 4, training device 40 is mounted on frame 12 and extends generally upwardly and rearwardly of bicycle 10. The training device 40 includes a substantially U-shaped handle member 42 extending horizontally and transversely of the bicycle 10 and connected to rear wheel hub 30 at axle 32. The bracing member 44, which is also substantially U-shaped, extends between handle member 42 and seat tube 14. Handle member 42 extends upwardly a distance H above the ground 87, i.e. bottom of rear wheel 28, and rearwardly from bicycle 10 a distance R sufficient to permit an adult or helper 80 to extend their arms 86 a distance E and grip the handle member 42 with their hands 81 to stabilize the bicycle 10. The distance R+E is sufficient to allow the helper 80 to walk or run behind the bicycle 10 such that the stride of the helper's legs 83 does not cause his feet 85 to hit or become entangled in rear wheel 28.

Handle member 42 is preferably one piece and tubular, having a grippable base section 46 and legs 48, 50 extending generally downwardly from opposite ends thereof such that the handle member 42 generally forms the U-shape. The distal portions 31 of the legs 48, 50 include a plurality of holes 33 for receiving axle 32 extending through hub 30. A nut (not shown) is received over the ends of the axle 32 to secure legs 48, 50 to bicycle 10. The distal portions 31 may include a bend such that distal portions 31 are parallel to rear wheel 28. Holes 33 may be used to adjust the height H of grippable base section 46. The grippable base section 46 of the handle member 42 preferably includes a conformable sleeve 47 (FIG. 1), which extends the length of the base section 46 and may extend a short distance along legs 48, 50.

As best shown in FIG. 4, bracing member 44 is generally U-shaped and is preferably fashioned from a single piece of tubular metal. The bracing member 44 has a central transverse section 56 extending transversely of bicycle 10 and arms 58, 60 extending distally and forwardly from opposite ends of transverse section 56. The proximate portions 62, 64 of the arms 58, 60 are straight sections. The distal portions 66, 68 of arms 58 and 60 are angled and secured to seat tube 14 below seat 38 using bolts, screws or other conventional securing means. Preferably, attachment is made at the seat clamp which holds the seat 38 to the seat tube 14. However, a separate clamp may be used to connect the arms 58, 60 to the seat tube 14.

Referring now to FIG. 3, bracing member 44 extends between legs 48, 50 and central transverse section 56 is disposed rearwardly of legs 48, 50. Proximate portions 62, 64 of the arms 58, 60 of the bracing member 44 each include at least one and preferably a plurality of holes 70 therethrough, extending generally parallel to the transverse section 56. To interconnect the handle member 42 and bracing member 44, the legs 48, 50 include holes 72 therethrough, which align with holes 70 in the proximate portions 62, 64 of arms 58, 60. A bolt may be passed through aligned holes 70, 72 and a nut and lock washer (not shown) secured over the extending portion thereof to secure the handle member 42 and bracing member 44 together. Alternatively, a clevis pin or other securable connector may be used. The plurality of holes 70 in the proximate portions 62, 64 of arms 58, 60 of the support frame 44 allow for adjustment of the height H of the grippable base section 46 with respect to the ground 87 and the distance R of the grippable base section 46 behind the rear wheel 28. Proximate portions 62, 64 are generally straight to provide a constant width therebetween for the passage between legs 48, 50 and the adjustment of handle member 42. As shown in FIG. 3, by selecting the appropriate hole 70 for alignment with hole 72 and hole 31 for receiving axle 32, the height H and rearward extension R of the grippable base section 46 is established by varying the angular disposition and height of handle member 42 with respect to bicycle 10.

The handle member and bracing member 42, 44 are preferably manufactured by bending a metallic tubing with a conduit bender to the desired shape and flattening the free ends of each member 42, 44 or by securing a manufactured end piece for ease of attachment to the bicycle. The conduit may be of steel, chrome, aluminum, or other metal. Holes 70, 72 may be placed through the conduit by drilling a proper sized hole therethrough on a drill press.

Upon assembly of the handle member 42 and bracing member 44 on the frame 12 of bicycle 10, the grippable base section 46 of handle member 42 is preferably located at a height H above ground level which will allow the helper 80 to have the helper's arms 86 in a generally horizontal position, i.e. parallel with the ground 87, when the helper 80 grasps the grippable base section 46. Also, the grippable base section 46 is disposed rearward of rear bicycle wheel 28 a distance R such that the helper 80 may stand upright and have a stride while running or walking that does not cause the helper's feet 85 to hit or become entangled with rear wheel 28. It is preferred that the grippable base section 46 be mounted upwardly and rearwardly of bicycle 10 to allow the helper to be directly centered with the load on the bicycle 10 caused by the rider 82. Since the stride or leg extension of the helper 80 typically is within the distance E of the horizontal arm extension of the helper 80, the rearward extension R may be as little as one inch behind the rear wheel 28 so as to allow the helper 80 to grasp the handle member 42 and still avoid any contact by the feet 85 with the rear wheel 28.

Further, it is preferable that the grippable base section 46 be located at a height H above the ground 87 which is at a point above the center of gravity when the rider 82 is on the bicycle 10. Preferably, this causes the grippable base section 46 to be disposed above the handle bars 28. Such positioning allows a higher moment arm to be applied by the helper.

The design and construction of the handle member 42 and base member 44 provide a very stiff and stable extension to the frame 12 of the bicycle 10. With handle member 42 and bracing member 44 being generally U-shaped in the form of a triangle or trapezoid open at its apex, the handle member 42 does not flex with respect to the frame 12 of the bicycle 10. Thus, there is great lateral stability particularly with the tubular construction of members 42 and 44. The helper's application of force to the grippable base section 46 causes an immediate response to the frame 12 of the bicycle 10 thereby counteracting any tipping of the bicycle by the inexperienced rider. For example, if the bicycle were to tip to the right, the helper 80 would apply a counteracting force to the left thereby placing leg 50 in tension and leg 48 in compression. Such force would then counteract the moment caused by the rider which tends to tip the bicycle 10 to one side.

As illustrated in FIG. 2, the use of the training device 40 by a helper 80 in conjunction with a bicycle 10 and rider 82 is shown. Helper 80 has arms 86 with shoulders 88 having a width W. The width W of the shoulders of an adult with a typical height and build is on the order of 16 to 30 inches. Therefore the grippable base section 46 is preferably 16 to 30 inches long, or, the length of grippable base section 46 is at least two-thirds of the width W and preferably substantially the same width. As a result, the helper 80 may be centered behind the bicycle 10 and extend his arms 86 forwardly a distance E from his shoulders 88 to grasp the grippable base section 46 at or adjacent the intersection of the legs 48, 50 with the grippable base section 46. This allows the helper 80 to stand upright behind the bicycle 10, with the helper's body in vertical alignment with the bicycle 10 and with his arms 86 in an extended position where the muscles are useful to their greatest mechanical advantage. For the average height and build of an adult, preferably, height H is in the range of 36 to 48 inches and preferably 42 inches; distance R is in the range of 1 to 12 inches and preferably 6 inches; and distance E is in the range of 12 to 24 inches.

Further, because the helper may extend his hands slightly downwardly along the legs 48, 50 of the training device, i.e., slightly below the intersection of the legs 48, 50 with the grippable base section 46, it is easier to upright the bicycle 10 if it tips, because one of the helper's hands can grasp and pull on one of the legs 48, 50, i.e., the fingers can curl around one of the legs 48, 50 and the helper's hand pull on the leg upwardly towards the helper's body instead of along a leg where the hands must firmly grip one of the arms 58, 60 to prevent sliding while simultaneously laterally pulling on the handle member 42 to upright the bicycle 10, and thus the hands should not slip on the leg. The size of the helper 80 will vary considerably, and thus the height H and the rearward extension R of the grippable base section 46 may be adjustable if desired. To adjust the height of the grippable base section 46 with respect to the bicycle 10, different pairs of holes 70 and 72 may be joined as shown in FIG. 3, which results in a different ultimate height and rearward extension of the grippable section 46.

Training device 40 provides a lightweight, stable mechanism to allow a helper to walk or run behind a bicycle to help train a rider 82 to ride the bicycle 10. As the rider 82 learns to ride, two different falling modes are normally encountered. In the first mode, the rider 82 and bicycle 10 both actuate away from vertical in the same direction. In this mode, the helper must right the weight of both the bicycle 10 and rider 82. In the second mode, the bicycle 10 tips to one side, and the rider 82 overcompensates in the other direction. In either mode, the couple between the grippable section 46 and the bicycle 10, formed by the legs 48, 50 and arms 58, 60, tries to bend. However, because the handle member 42 is U-shaped, if the grippable section 46 is held horizontally as the bicycle tips, the grippable section 46 tends to move sideways while one of the legs 48, 50 is pulled into tension while the other is placed in compression. Because the bracing member 44 intersects the handle member's legs 48, 50 at holes 72, the span between the arms 58, 60 is fixed at three locations: at axle 32, transverse section 56 and grippable section 46. Further, the distance along each of the legs 48, 50 is fixed by connection to axle 32, transverse section 56 and grippable section 46. Therefore, the structure remains rigid as the bicycle tips and force is placed on grippable section 46 to right the bicycle which yields a very stable device.

Referring now to FIG. 5, a carrier 90 may be provided for use with trainer 40 to create a carrying platform on the bicycle 10. Carrier 90 is preferably a cloth or canvas member, but may be of plastic or wire, having a central portion 92 terminating in tubular portions 94 which are formed by folding the ends of central portion 92 over to create a sleeve. Tubular portions 94 are fitted over the conduit forming bracing member 44, and central 92 portion is a web extending between arms 58, 60 and transverse section 56.

Although the preferred embodiments of the invention have been described in terms of specific materials, other materials may be substituted therefor. For example, other lightweight tubing, or other non-tubular materials, may be used to form the training device. Likewise, carrier 90 may be formed of a plastic or other material and snapped on, or otherwise attached to arms 58, 60 and/or transverse section 56. As those skilled in the art will readily appreciate, many other modifications may be made to the preferred embodiments described herein without departing from the scope and spirit of the invention.

What is claimed is:

1. A training apparatus for installation on the frame and adjacent the rear wheel of a bicycle comprising:

a handle member having a base section and a pair of legs extending distally from the base section, the distal ends of the legs being adapted for connection to the bicycle frame;

a substantially U-shaped bracing member having a transverse section and a pair of arms extending distally from the transverse section, the arms having distal ends adapted for connection to the bicycle frame and proximate portions attached to the legs of the handle member, whereby upon connection of the handle member to the bicycle frame the base section is disposed above the bicycle frame and rearward of the bicycle's rear wheel.

2. The training apparatus of claim 1, wherein the legs of the handle member converge for connection to the bicycle frame.

3. The training apparatus of claim 1, wherein said bracing member extends between the legs of said handle member.

4. A training apparatus for installation on the frame of a bicycle comprising:

a handle member having a base section and a pair of legs extending distally from the base section, the distal ends of the legs being connectable to the bicycle frame;

a bracing member having a transverse section and a pair of arms extending distally from the transverse section, the arms having distal ends adapted for connection to the bicycle frame and proximate portions attached to the legs of the handle member, whereby upon connection of the handle member to the bicycle, the base section is disposed above and rearward of the bicycle frame, the base section of the handle member being greater than 12 inches in length.

5. The training apparatus of claim 4, wherein the base section of the handle member is between 16–30 inches in length.

6. The training apparatus of claim 4 wherein said handle member comprises a conformable sleeve for comfortably gripping said handle.

7. A training apparatus for installation on the frame of a bicycle comprising:

- a handle member having a base section of greater than 12 inches in length and a pair of legs extending distally from the base section, the distal ends of the legs adapted for connection to the bicycle frame;
- a bracing member having a transverse section and a pair of arms extending distally from the transverse section, the arms having distal ends adapted for connection to the bicycle frame and proximate portions attached to the legs of the handle member, upon connection of the handle member to the bicycle, the base section is disposed above and rearward of the bicycle frame, the location of the connection of the handle member and bracing member being variable.

8. A training apparatus for installation on the frame of a bicycle comprising:

- a handle member having a base section and a pair of legs extending distally from the base section, the distal ends of the legs adapted for connection to the bicycle frame;
- a bracing member having a transverse section and a pair of arms extending distally from the transverse section, the arms having distal ends adapted for connection to the bicycle frame and proximate portions attached to the legs of the handle member, whereby upon connection of the handle member to the bicycle, the base section is disposed above and rearward of the bicycle frame; and
- a carrier member extending between the arms of the bracing member.

9. The training apparatus of claim 8, wherein said carrier member is also secured to said transverse section.

10. A training apparatus for installation on the frame and adjacent the rear wheel of a bicycle, comprising:

- a handle having a horizontal member adapted four extending transversely across the rear of the bicycle and a pair of supports adapted for extending from said horizontal member to the frame, said supports being adapted for adjustable attachment to the frame;
- a brace having a transverse member and a pair of support arms adapted for extending from said transverse member toward the bicycle frame, said pair of support arms having a straight section and an angled section with said straight sections extending between and adjustably attached to said supports of said handle member, and said angled sections adapted for extending from said straight sections to the bicycle frame, said angled sections being adapted for attachment to the bicycle frame;
- said horizontal member having a width of at least 16 inches and being adapted to be disposed above the bicycle; and
- said horizontal member being adapted to project a distance behind the bicycle's rear wheel.

11. The training apparatus of claim 10, wherein said horizontal member is adapted to be disposed above the center of gravity of the bicycle.

* * * * *